United States Patent
Fields et al.

(10) Patent No.: US 11,970,180 B1
(45) Date of Patent: Apr. 30, 2024

(54) DETERMINING RISK FOR A USER OF AN AUTONOMOUS VEHICLE

(71) Applicant: STATE FARM MUTUAL AUTOMOBILE INSURANCE COMPANY, Bloomington, IL (US)

(72) Inventors: Brian Mark Fields, Normal, IL (US); Leo Nelson Chan, Normal, IL (US); Kristopher Keith Gaudin, Bloomington, IL (US); Aaron Williams, Congerville, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 15/957,687

(22) Filed: Apr. 19, 2018

(51) Int. Cl.
*B60W 50/12* (2012.01)
*B60W 50/14* (2020.01)
*G05D 1/00* (2006.01)
*G06Q 40/08* (2012.01)

(52) U.S. Cl.
CPC ............ *B60W 50/12* (2013.01); *B60W 50/14* (2013.01); *G05D 1/0061* (2013.01); *G05D 1/0088* (2013.01); *G06Q 40/08* (2013.01); *B60W 2540/30* (2013.01); *G05D 2201/0213* (2013.01)

(58) Field of Classification Search
CPC ................ B60W 50/12; B60W 50/14; B60W 2050/143; B60W 2050/146; B60W 2050/16; G05D 1/0061; G05D 1/021; G05D 1/0088; G06Q 40/08; G06F 19/328
See application file for complete search history.

(56) References Cited

U.S. PATENT DOCUMENTS

| | | | |
|---|---|---|---|
| 8,965,621 B1* | 2/2015 | Urmson | G05D 1/0214 701/23 |
| 9,311,271 B2 | 4/2016 | Wright | |
| 9,633,487 B2 | 4/2017 | Wright | |
| 10,192,369 B2 | 1/2019 | Wright | |
| 10,198,879 B2 | 2/2019 | Wright | |
| 2011/0193707 A1* | 8/2011 | Ngo | G08B 21/06 340/576 |
| 2012/0083960 A1* | 4/2012 | Zhu | G05D 1/0214 701/23 |

(Continued)

*Primary Examiner* — Faris S Almatrahi
*Assistant Examiner* — Andrew J Cromer
(74) *Attorney, Agent, or Firm* — MARSHALL, GERSTEIN & BORUN LLP

(57) ABSTRACT

Vehicles may have autonomous capabilities that permit the vehicle to navigate according to varying levels of participation by a human operator. A human operator may be associated with a driving capability profile and the environment surrounding a vehicle may be associated with an environmental risk profile. A vehicle, or another party in communication with a vehicle, may determine whether, based on the human operator's driving capability profile and the environmental risk profile, it is likely that the vehicle will be navigated more safely if there is a change to the vehicle's autonomous capabilities and a corresponding change to the human operator's driving responsibilities. If it is determined that a change in autonomous vehicle capability is likely to increase safe navigation of the vehicle, an insurer may offer an insurance premium cost reduction if the human operator agrees to the proposed change in autonomous capabilities.

23 Claims, 10 Drawing Sheets

(56) References Cited

U.S. PATENT DOCUMENTS

| | | | |
|---|---|---|---|
| 2014/0257874 A1* | 9/2014 | Hayward | B60C 1/00 |
| | | | 705/4 |
| 2014/0276090 A1* | 9/2014 | Breed | A61B 5/14546 |
| | | | 600/473 |
| 2015/0228129 A1* | 8/2015 | Cox | G07C 5/0808 |
| | | | 701/29.1 |
| 2017/0015331 A1* | 1/2017 | Laur | G05D 1/0061 |

* cited by examiner

DETERMINING RISK FOR A USER OF AN AUTONOMOUS VEHICLE

BACKGROUND

Vehicles may be equipped with sensors and processing and communication capabilities that allow the vehicle to navigate autonomously without human intervention. Autonomous vehicle navigation is not possible, however, under all circumstances. In some situations, a vehicle may lack the capability to navigate autonomously such as adverse or extreme weather conditions, in the event of the loss of vehicle sensors or a communications link, under disaster conditions, due to vehicle collisions in the area, etc. When a vehicle can no longer navigate autonomously, control of the vehicle may be returned to a human operator. Transfer of control of the vehicle to a human operator represents a potential danger due to the vehicle's autonomous nature—a human operator who has been traveling in the vehicle may be inattentive to road conditions and unprepared to make the decisions and exercise the motor control needed to safely operate the vehicle.

SUMMARY OF THE DISCLOSURE

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Systems and methods are disclosed for determining risk for a user of an autonomous vehicle. Vehicles may have autonomous capabilities that permit the vehicle to navigate according to varying levels of participation by a human operator. A human operator may be associated with a driving capability profile and the environment surrounding a vehicle may be associated with an environmental risk profile. A vehicle, or another party in communication with a vehicle, may determine whether, based on the human operator's driving capability profile and the environmental risk profile, it is likely that the vehicle will be navigated more safely if there is a change to the vehicle's autonomous capabilities and a corresponding change to the human operator's driving responsibilities. If it is determined that a change in autonomous vehicle capability is likely to increase safe navigation of the vehicle, an insurer may offer an insurance premium cost reduction if the human operator agrees to the proposed change in autonomous capabilities.

In one aspect, a method is disclosed for determining a risk associated with an operator of a vehicle. The method may include identifying a human operator of the vehicle, the human operator being associated with a driving capability profile; determining an environmental risk profile of an environment of the vehicle; determining whether the vehicle satisfies a control change condition based on the driving capability profile and the environmental risk profile; and transmitting a request to the vehicle to initiate a transfer of control if the vehicle satisfies the control change condition.

In another aspect, a system is provided for determining risk in an autonomous vehicle. The system may include an evaluator configured to evaluate a human operator of a vehicle, the evaluator including one or more sensors configured to detect human operator parameters; an environmental threat assessor configured to assess one or more road hazards; and a control circuit configured to initiate a change in control of the vehicle based on the human operator parameters and the one or more road hazards.

In yet another aspect, a method for determining a risk associated with an operator of a vehicle is disclosed. The method may include identifying a human operator of the vehicle, the human operator being associated with a driving capability profile; determining an environmental risk profile of an environment of the vehicle; determining whether the vehicle satisfies a control change condition based on the driving capability profile and the environmental risk profile; and transmitting an offer to the human operator if the vehicle satisfies the control change condition, the offer including a reduction to an insurance premium cost if the human driver agrees to a request to initiate a transfer of control of the vehicle.

The methods may be implemented via computer systems, and may include additional, less, or alternate actions or functionality. Systems or computer-readable media storing instructions for implementing all or part of the method described above may also be provided in some aspects. Systems for implementing such methods may include one or more of the following: a special-purpose computing device, a personal electronic device, a mobile device, a wearable device, a processing unit of a vehicle, a remote server, one or more sensors, one or more communication modules configured to communicate wirelessly via radio links, radio frequency links, and/or wireless communication channels, and/or one or more program memories coupled to one or more processors of the personal electronic device, processing unit of the vehicle, or remote server. Such program memories may store instructions to cause the one or more processors to implement part or all of the method described above. Additional or alternative features described herein below may be included in some aspects.

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

DETAILED DESCRIPTIONS

Figure 1:
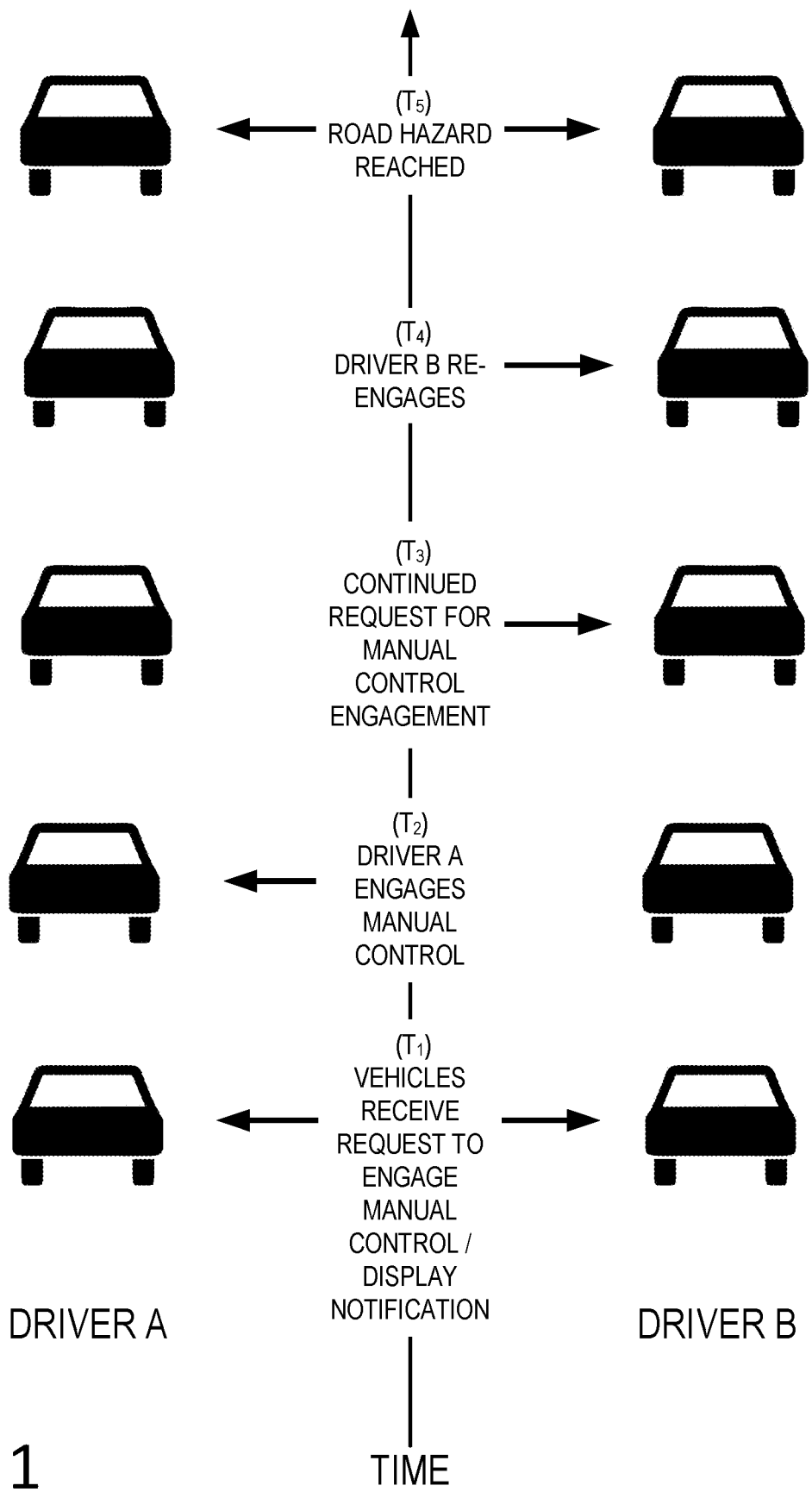
FIG. 1 is a time-series schematic diagram of the response of two different human operators to a request to engage manual control in a vehicle with autonomous capabilities.

Autonomous vehicles may exercise a range of capabilities when navigating on open road conditions. An autonomous vehicle need not be viewed as operating purely autonomously or purely manually. The Society of Automotive Engineers (SAE) has identified at least six levels of autonomous vehicle capability ranging from no driving automation (Level 0) to full automation (Level 5). As a vehicle moves up the levels of capability, additional autonomous competencies are added to the vehicle's set of skills (e.g., adaptive cruise control, parking assist, lane assist, traffic jam assist, conditional automation, high automation, full automation, etc.).

At the various points on the vehicle's autonomous skill ladder, a human operator exercises an appropriate level of manual control. If a vehicle supplies only adaptive cruise control or parking assist capabilities, then the human operator must exercise a high level of manual control and is responsible for any and all non-autonomous aspects of the vehicle. If a vehicle supplies high or full automation, on the other hand, a human operator may participate at a low level, or even not at all, in navigating the vehicle. If a vehicle exercises a high level of autonomous capability (e.g., Levels 4 or 5), a human operator may become disengaged from the road and unaware of the road environment surrounding the vehicle. The human user may become focused on non-driving tasks (e.g., reading, working, playing games, conversations with other passengers, phone calls, etc.). A human operator may even go to sleep and lose all contact with controlling the vehicle.

It may be desirable for an autonomous vehicle to shift from one level of autonomous capability to another, such as due to changing road conditions, weather conditions, due to a vehicle crash, disaster or emergency situation, etc. To the extent the human operator will need to change her involvement in piloting the vehicle when the vehicle shifts between levels of automation, she must be notified of the impending change. A variety of notification types are used in the system for manual control re-engagement to communicate with the human operator regarding upcoming changes in the human operator's responsibilities in piloting the vehicle. A notification may be more intrusive to the human operator or less intrusive to the human operator depending on the urgency of the impending change to the vehicle's capabilities and the human operator's responsibilities.

A change to a vehicle's autonomous capability may also have a variable time target in which the change should be made. Some changes to a vehicle's autonomous capabilities must be made quickly, such as in emergency situations (e.g., a vehicle crash or other rapidly approaching road hazard, if the human operator experiences an emergent medical or health problem, etc.). Other changes to a vehicle's autonomous capabilities need not be made quickly (e.g., if adverse or extreme weather conditions are forecasted but not yet experienced, if a human operator is nearing the limits of her ability to stay awake, if a human operator experiences abnormal but not threatening health issues, etc.).

A vehicle may receive an indication from third-party sources of an impending road hazard and may determine the urgency of altering the vehicle's autonomous capabilities on its own. Vehicles may communicate wirelessly with one another in to relay updates to one another regarding changing road conditions as experienced by the vehicles themselves. The vehicles may communicate according to a peer-to-peer network in which the vehicles connect with one another directly (e.g., a swarm) or a centralized party may collect information from the vehicles, optionally process the information, and selectively provide relevant information to vehicles as the vehicles need it (e.g., client/server). For example, if a vehicle crash occurs on a road and vehicles in the vicinity detect the crash occurrence, the vehicle in the vicinity of the crash may communicate an emergency signal to vehicles approaching the crash site on the road such that those vehicles may take precautions to avoid crashing into any vehicles that are slow, stopped, or otherwise navigating differently than expected due to the crash.

In another implementation, a vehicle may receive an indication from a third-party that the vehicle should alter its autonomous capabilities and may receive a target time period in which to make the change therewith. A centralized authority (e.g., a weather prediction bureau, an insurer, a vehicle owner, a government agency, etc.) may determine that a change should be made to a vehicle's autonomous capabilities based on information regarding the vehicle's environment and may communicate a request to make the change to the vehicle. Such a request may accompany a target time in which to make the change to the vehicle's capabilities.

A vehicle may adjust its autonomous capabilities to increase or decrease the number of autonomous capabilities, depending on the situation the vehicle is in. In some situations, the vehicle maybe ill-suited to safely navigate a situation autonomously, and manual control may be preferable (e.g., navigation in close quarters with other vehicles wherein human communication is needed to coordinate with the operators of other vehicles, if the vehicle experiences a sensor or other hardware failure, if the vehicle loses a communications link, etc.). In other situations, a human operator may be more ill-suited to safely navigate a situation than the vehicle would be autonomously. It may be known that human operators in general, or a specific human operator, is likely to make a mistake that could lead to a crash that an autonomously controlled vehicle would not make. For example, if a vehicle is traveling at a high rate of speed in low visibility conditions (e.g., heavy fog, frequent road elevation changes, blind spots, etc.) and is approaching a sudden traffic jam wherein other vehicles are traveling at a comparatively much slower rate of speed or are stopped on a road, it may be known that human operators are less likely to reduce speed in time than an autonomous vehicle would be. If the vehicle detects such a road condition approaching, it may request the human operator relinquish some or all control of the vehicle to reduce risk of a vehicle crash.

Different human operators will respond differently to notifications of changes to the vehicle's autonomous capabilities. Human operators exhibit differences from one another in terms of attention span, ability to multitask, ability to shift focus from one activity to another after receiving a notification, etc. To some extent, these differences are natural characteristics of the human operators themselves (e.g., some people are more likely than others to become engrossed in reading a book and may take more time to respond to a notification of impending vehicle autonomous capability change than other people who may tend not to become engrossed in reading a book while riding in a car). In other situations, a human operator's ability to acknowledge a notification and prepare to exercise more or less control over the vehicle may depend on other aspects of the human operator that may change over time (e.g., intoxication level, how well rested the human operator is, whether the human operator has become focused on another activity or remains aware of the vehicle's surroundings, the health of the human operator, etc.). In yet other situations, a human operator's ability to acknowledge a notification and prepare to exercise more or less control over the vehicle may change slowly over time (e.g., a human operator's eyesight may deteriorate over time, motor control deteriorates with age, etc.).

FIG. 1 is a time-series schematic diagram 100 illustrating responses by two different human operators to a request to engage manual control in a vehicle with autonomous capabilities. The two drivers are designated in FIG. 1 as Driver A and Driver B. Drivers A and B are shown in a time progression from time $T_1$ to time $T_5$ in the process of engaging manual control of their respective vehicles. Both of the vehicles of Drivers A and B are vehicles that have some level of autonomous capabilities and may be shifted up or down among levels of autonomous capability to add or remove autonomous competencies to the set of autonomous capabilities exercised by the vehicle at a point in time.

At a time $T_1$, the vehicles of Drivers A and B receive a request to engage manual control in their respective vehicles. The request to engage manual control may originate from a security arbiter on the vehicles that makes autonomous capability decisions based on human operator parameters detected from observing the human operators (e.g., Driver A and Driver B) in the vehicles, road condition data (e.g., relayed from other vehicles, received from a monitoring party, based on local vehicle diagnostic data, etc.), and/or data regarding the human operators themselves (e.g., driving history, demographic data, insurance coverage data, etc.). In another implementation, the request to engage manual control may originate from another party with an interest in the vehicle and/or the occupants therein (e.g., a vehicle owner, a vehicle manufacturer, an insurer, a law enforcement or other government agency, etc.). Also at time $T_1$, the vehicles of Drivers A and B display a notification requesting to engage manual control to the human operators of the vehicles. The notification may be displayed by a notification server on the vehicle that displays a notification as specified by a security arbiter on the vehicle.

At a time $T_2$, Driver A engages manual control. Various metrics may be used to determine when a human operator has successfully completed an engagement of manual control. Some metrics may be human operator parameters sensed or detected by the vehicle. For example, a camera disposed inside the vehicle may focus on a human operator's eyes and eye movements to determine whether the human operator's attention is focuses on road conditions and the environment surrounding the vehicle or if the human operator's attention is focused on objects inside the vehicle. A human operator's eye movements may also indicate whether the human operator is frequently checking mirrors (e.g., rear-view mirror, side mirrors) and whether the eye movement patterns match known patterns of attentive driving. Successful completion of manual control engagement may also be detected by interactions of the human operator with the controls of the vehicle (e.g., operating the pedals, moving the steering wheel, shifting gears, etc.).

At a time $T_3$, Driver A has engaged manual control but Driver B has not. In one implementation, the vehicle displays a continued request for manual control engagement of Driver B. The continued request for manual control engagement of Driver B may include more or different elements such as lights, haptic feedback, a text message, sound instructions or alarms, etc. At a time $T_4$, Driver B engages manual control, and at time $T_5$, when the vehicles reach the road hazard, both are under manual control.

As illustrated in the example of FIG. 1, different individual human operators respond differently to notifications to engage manual control of a vehicle (or to change a level of autonomous capability of a vehicle). In at least one implementation, Driver A and Driver B both exhibit detected human operator parameters (level of engagement in another activity, health status, etc.) that indicate a similar level of alertness. Nevertheless, the two drivers respond differently to a notification to increase driving responsibility and take a different amount of time before they are able to engage manual control of the vehicle (from $T_1$-$T_2$ for Driver A in comparison to $T_1$-$T_4$ for Driver B). These differences in reaction time may be recorded in a driving ability profile of each of the two drivers and included in the human operator parameters relied upon to determine when to transition control of the vehicle, what types of alerts to use to notify the human operators of an impending change in driving responsibility, and how long the human operators are expected to need to successfully engage manual control.

Figure 2:
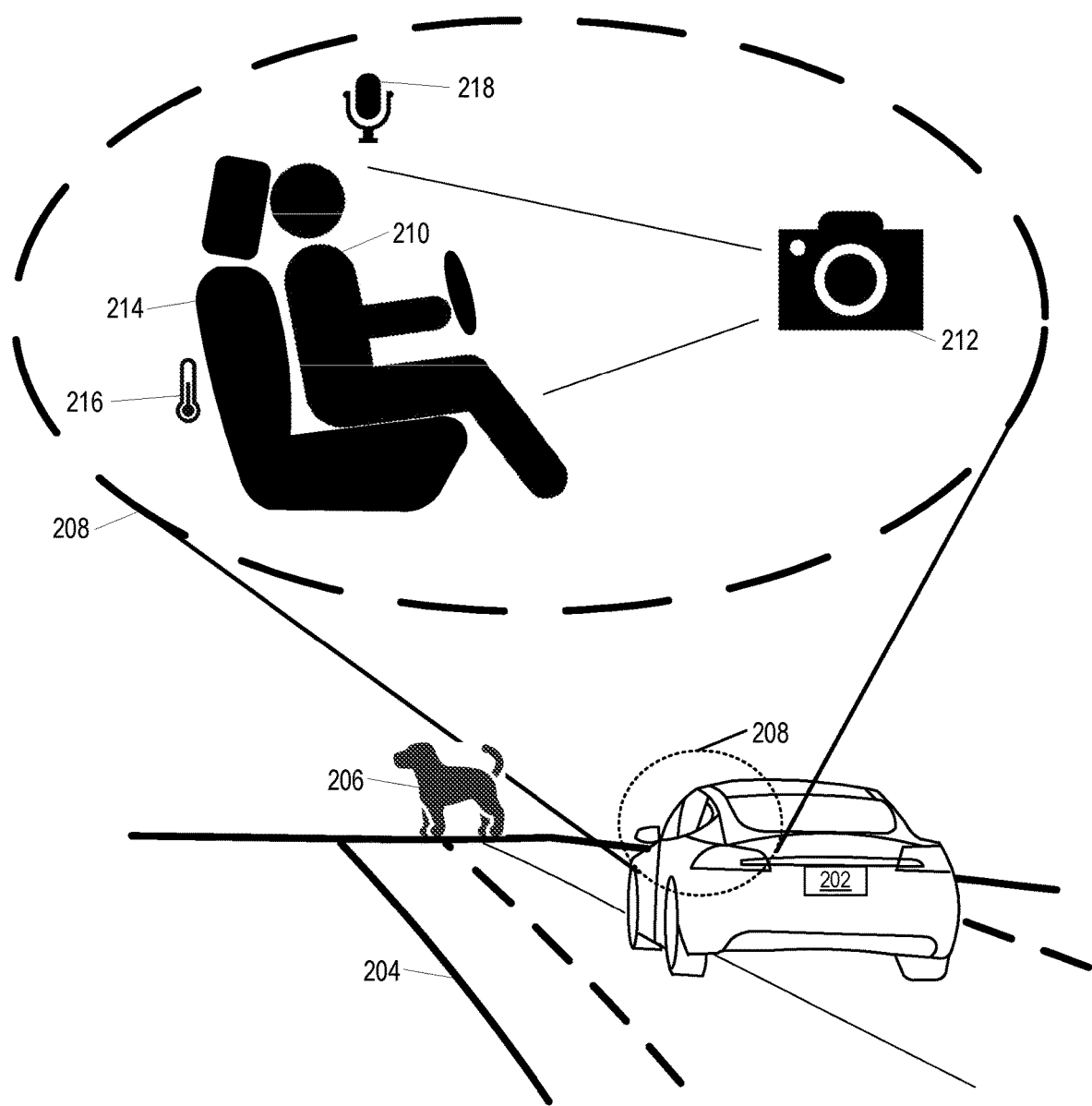
FIG. 2 is a schematic diagram of an example system for detecting human operator parameters in a system for determining driver risk in a vehicle with autonomous capabilities.

FIG. 2 is a schematic diagram of an example system 200 for detecting human operator parameters in a system for determining driver risk in a vehicle. The system 200 includes a vehicle 202 with more than one level of autonomous capabilities navigating on a road 204. The vehicle 202 may include one level of pure manual control and one or more additional levels of enhanced automated control. When the vehicle approaches a potential road hazard 206 or other road conditions under which a change in the autonomous capabilities of the vehicle 202 are warranted, the vehicle 202 may display a notification to the human operator 210 to expect an upcoming or immediate change in the responsibilities of the human operator 210 in piloting the vehicle 202.

One factor in determining the type of notification of a change in autonomous capabilities of the vehicle 202 to the human operator 210 is the current state of the human operator 210. An alertness level of the human operator 210 may be estimated based on objective data collected by sensors inside the vehicle 202 such as the sensors shown in the bubble 218 of the interior of the vehicle 202. In one implementation, an optical imaging device 212 (e.g., a camera) is located inside the vehicle 202 and is directed towards the human operator 210. The camera 212 may capture images of the human operator 210 that may be analyzed to extract human operator parameters used to determine an alertness state of the human operator.

In at least one implementation, the human operator parameters include a body position of the human operator. If the human operator 210 is sitting upright in the seat 214 and has her hands on or near a steering wheel, it is likely that the human operator 210 will be more responsive to a change in driving responsibilities than if the human operator 210 is reclined in the seat 214 without hands near the steering wheel. Images captured by the camera 212 may be analyzed by components of the vehicle 202 to determine whether the human operator is in a body position that indicates a greater or lower level of alertness. The camera 212 may capture a series of images of the human operator 210 (e.g., a video) that may be compared by components of the vehicle 202 to determine an activity level of the human operator 210. For instance, if the human operator 210 is asleep, then she will likely exhibit a different movement patterns than a human operator 210 who is awake. Another type of objective data that may be collected by the camera 212 regarding the human operator's alertness and preparedness for accepting a change in driving responsibilities is the activity in which the driver is engaged. If analysis of images captured by the camera 212 indicate that the human operator 210 is holding a book or electronic device, for example, then the human operator 210 is more likely to experience a slower change of focus away from the book and to road conditions than a human operator 210 who is not holding a book or electronic device. The camera 212 may also capture images of the face of the human operator 210 to determine whether her eyes are open or closed, focused on the environment outside of the vehicle 202 or inside the vehicle 202 and other factors such as fatigue.

The human operator parameters may also include non-visual data collected from the interior of the vehicle 202. In at least one implementation, non-visual data includes biometric data of the human operator (e.g., heart rate, breathing rate, body temperature, perspiration rate, etc.). Biometric data may be collected via the seat 214 in the vehicle 202 because the seat is in physical contact with the human operator 210, which facilitates the collection of various types of biometric data. For example, a sensor 216 may be embedded in the seat such that the sensor 216 can collect relevant data (e.g., a thermometer, a heart rate sensor, a breathing rate sensor, a perspiration sensor, etc.).

Other types of sensors that not embedded in the seat 214 may also be used to collect non-visual data for the human operator parameters. In one implementation, an audio sensor 218 detects sounds inside the vehicle 202. If a human operator is speaking to another occupant of the vehicle 202 or on a phone, the human operator's speech will be recognized by the audio sensor 218. The human operator parameters may then reflect that the human operator is awake and likely somewhat but not completely focused on the environment surrounding the vehicle. The sensor 218 may also detect other types of sounds such as the human operator 210 moving inside the vehicle, suggesting an activity level of the human operator 210.

Human operator parameters may also include historical information regarding the human operator 210. In one implementation, components of the vehicle 202 compile historical data regarding the human operator 210. For example, the speed at which the human operator 210 responded to various notifications of an upcoming change to the vehicle's autonomous capabilities (e.g., notifications of various levels of intrusiveness, audio notifications, video notifications, haptic feedback notifications, etc.) As another example, the vehicle 202 may compile, how well the human operator 210 reacted to various types of road conditions and potential hazards (e.g., how often does the human operator 210 engage in emergency braking in various road conditions such as snow or rain, does the human operator 210 tend to lane drift at high speed, is the human operator 210 prone to panicked control movements in heavy traffic, etc.).

Historical information regarding the human operator 210 may also be received via a communications device at the vehicle 202 from a third-party. In one implementation, an insurer of the vehicle 210 compiles historical driving information regarding the human operator 210 such as vehicle crash history, vehicle usage history, and biographical data such as age and education level that may be used to determine an alertness level of the human operator 210. For example, if the insurer knows that the human operator 210 usually operates the vehicle early in the morning and never at night, the insurer may determine that that human operator is not accustomed to driving in the middle of the night. If the human operator does drive one day in the middle of the night, then the insurer may determine that this poses a greater than usual safety risk for the particular human operator. Other rules may also be applied based on historical data such as young drivers under age 18 pose a greater risk when driving late at night, in adverse weather conditions, when the audio sensor 218 detects multiple young people in the vehicle 202 at the same time, etc.

Figure 3:
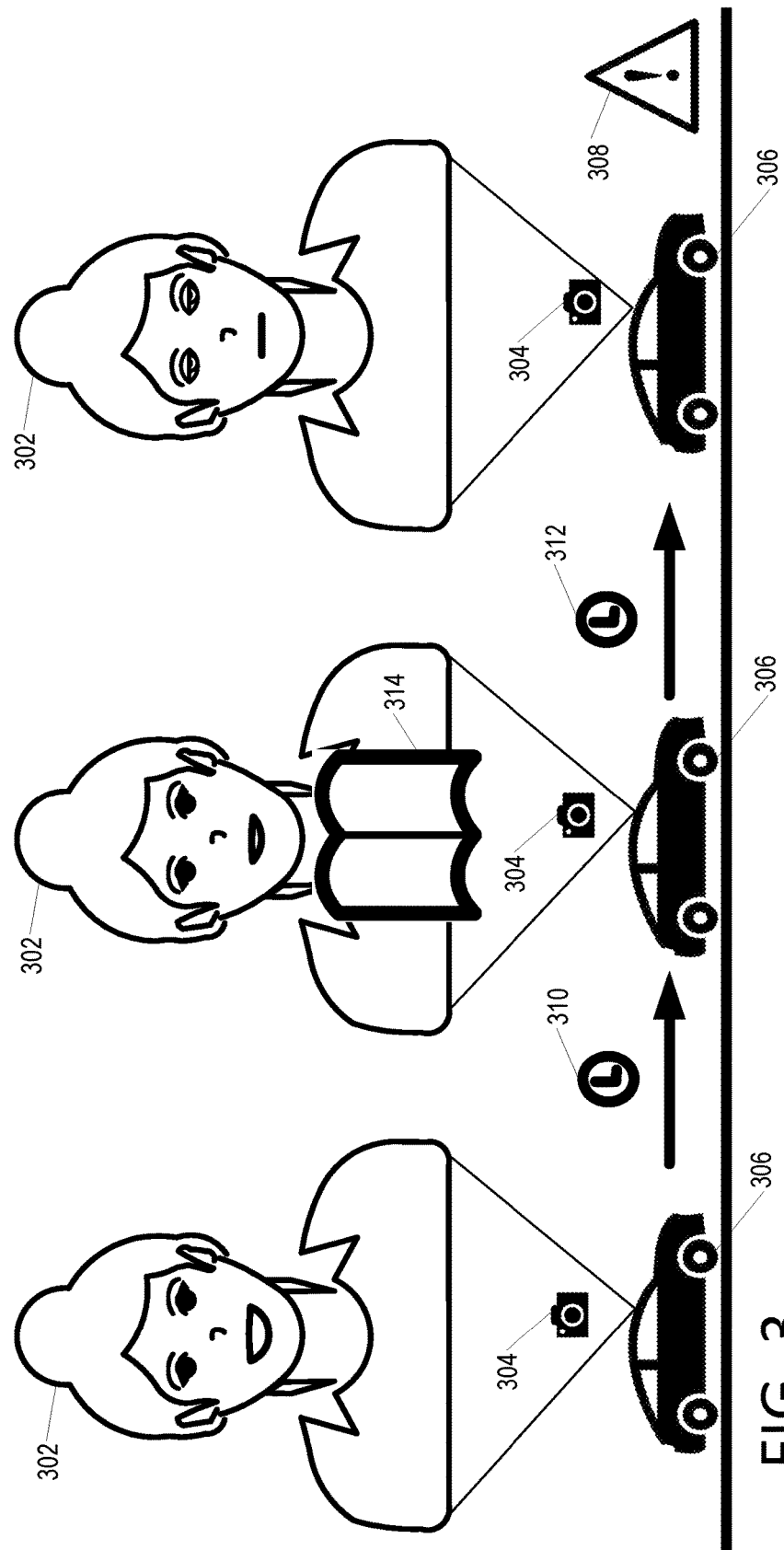
FIG. 3 is a time-series schematic diagram of an example system for determining risk of a human operator of a vehicle with autonomous capabilities.

FIG. 3 is a time-series schematic diagram of an example system 300 for determining risk of a human operator of a vehicle with autonomous capabilities. The vehicle 306 includes an image capture device 304 such as a camera. The camera may be directed towards the face of the human operator 302 and images captured thereof. Components of the vehicle 306 may analyze the images of the face of the human operator 302 to identify characteristics of the human operator 302 that are relevant to the human operator parameters used to determine an alertness level of the human operator 302.

The camera 304 may analyze various features of the human operator 302 to supply human operator parameters to the vehicle 306. For example, in a time period before time 310, the eyes of the human operator 302 are open and focused outside the window of the vehicle 306. The camera 304 may capture a series of images of the face of the human operator 302 to detect other features such as rapidity of eye movement, dilation of eye pupils, blinking, etc.

In a time period after time 310, the camera may capture more images of the face of the human operator 302. In a time period after time period 310, the eyes of the human operator 302 are still open, but are focused on a book 314. Images captured by the camera 304 may reflect that the eyes of the human operator 302 are no longer focused on the environment surrounding the vehicle 306, but instead are focused on the book 314. Images captured by the camera 304 may record features of the eyes of the human operator 302 such as eye movements indicating a speed at which the human operator 302 is reading. Slower reading speeds and other eye movements may indicate a fatigue level of the human operator 302.

If the eyes of the human operator 302 are no longer focused on the environment surrounding the vehicle, human operator parameters may include a level of distraction represented by a "score." For example, if the human operator 302 is focused on a book 314, it may be likely that the human operator is engaging in an extended period of perhaps intense concentration on the book 314. The longer the human operator 302 focuses on the book 314, the more likely she is to have a higher level of detachment from her environment. Such behavior may indicate that the human operator parameters should reflect a higher level of distraction. A security arbiter in the vehicle 306 may set a relatively longer period of time that would be expected before the human operator 302 responds to a notification of change to driving responsibility based on a higher distraction score in the human operator parameters. On the other hand, if the human operator 302 is only occasionally focusing on a handheld device (e.g., checking email, etc.), then the distraction of the human operator 302, while still present, may not be considered as distracted as long periods of reading a book 314. In such a case, a lower environmental detachment score may be included in the human input parameters and relied on by other components of the vehicle 306 to alert the human operator of an impending change in driving responsibility and management of shifting the vehicle from one level of autonomous control to another.

At a time period after time 312, the camera 304 may capture additional images of the face of the human operator 302 that indicate the human operator 302 is suffering from fatigue. Images captured by the camera 304 may show that that eye lids of the human operator 302 are not as open as before the human operator 302 began experiencing fatigue. Other eye-based indications include blinking rate, location of eye focus, and eye movement rapidity.

The human operator parameters collected by the camera 304 are used to determine an alertness level of the human operator 302. The determined alertness level may be used to determine whether a change should be made to the autonomous capability level of the 306 and whether the human operator 302 should take on more or less driving responsibility. If the vehicle 306 determines that an approaching road hazard 308 exists and the human operator 302 should take on more driving responsibility, then the vehicle may display a notification to the human operator 302. The type of notification displayed to the human operator 302 and the time period for which the notification should be displayed in advance of an encounter with the road hazard 308 depend on the alertness level of the human operator 302 and the human operator parameters sensed by components of the vehicle 306. For example, if the human operator 302 has a higher alertness level, such as in the time period before time 310, then the notification of a change to the vehicle's autonomous capabilities may be less intrusive or occur closer to the road hazard 208 because it is expected that the human operator 302 will be able to recognize the notification and increase driving responsibility relatively quickly. On the other hand, if an alertness of the human operator 302 is lower due to human operator parameters such as those examples after time 310 and after time 312 (e.g., occupied with another task, experiencing fatigue, etc.), then the notification of a change to the vehicle's autonomous capabilities may be more intrusive or occur farther away from the road hazard 208 because it is expected that the human operator 302 will need relatively more time to recognize the notification and prepare to increase driving responsibility.

Figure 4:
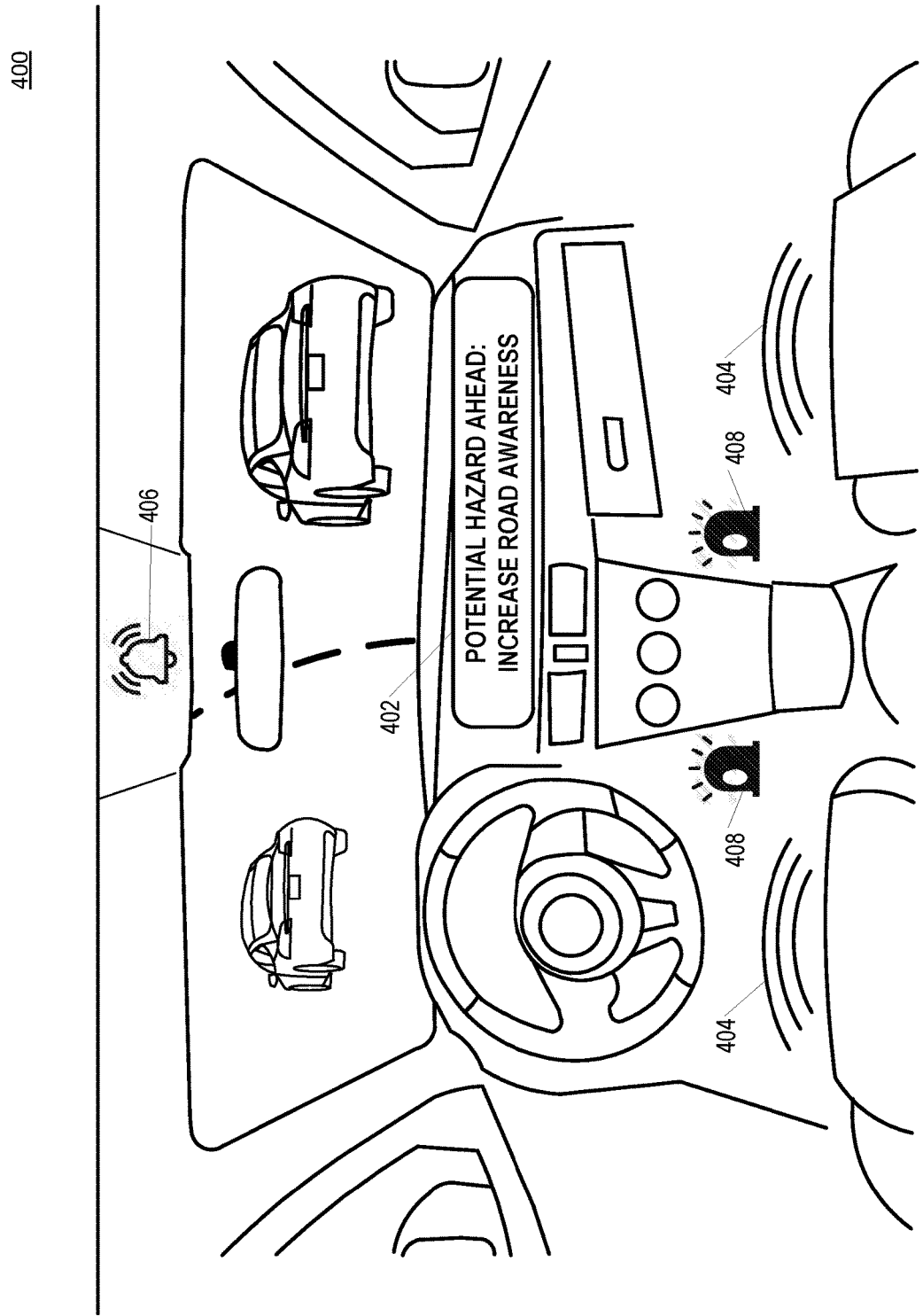
FIG. 4 is an in-vehicle view of an example system for determining risk of a human operator of a vehicle with autonomous capabilities.

FIG. 4 is an in-vehicle view of an example system 400 for determining risk of a human operator of a vehicle with autonomous capabilities. Included in the system 400 are a number of types of notifications to alert a human operator that the vehicle may shift to a different level of autonomous capability. The notifications range from less intrusive to a human operator to more intrusive to a human operator, depending on the urgency of the shift to another autonomous vehicle capability level and/or any approaching road hazards. Notifications that the vehicle will shift to a different level of autonomous capability may be tailored to an individual human operator based on collected human operator parameters, such as whether the particular human operator is in an occupied or distracted state, whether the particular human operator tends to respond well to certain types of notifications over other types of notifications, whether the human operator exhibits biomarkers that indicate a reduced capacity for driving (e.g., accelerated or irregular heart rate), whether an impending shift will require a greater or lesser degree of vehicle control on behalf of the human operator, etc.

In the implementation illustrated in FIG. 4, a text notification 402 appears on the dashboard of the vehicle. In one implementation, the text notification 402 alerts a human operator of an impending change to the level of autonomous control exercised by the vehicle or (as illustrated in FIG. 4) simply a notification to increase awareness of road conditions in preparation for a potential change to autonomous capabilities. For example, if the vehicle or another entity has determined that a greater degree of autonomous control is better suited to the potential road hazard, then the text notification 402 may indicate to the human operator that the vehicle will include greater autonomous capability (and thus less human responsibility) to navigate the upcoming road hazard. The text notification may include information regarding the road hazard or an impending shift of autonomous vehicle capabilities (e.g., whether the human operator is expected to exercise a greater or lesser degree of control, the urgency of the hazard or shift in capabilities, an expected time until the hazard is encountered or the shift in capabilities is executed, etc.).

In the case of a notification 402 that merely requests an increased level of awareness on the part of the human operator, such a notification may provide a "head start" on the process of transitioning some or all control from the vehicle to the human operator. In at least one implementation, the notification 402 is one of a cascade of notifications ranging from merely requesting increased awareness to transfer of full control to the human operator, with intermediate notifications for transfer of discrete autonomous capabilities to the human operator (e.g., braking but not steering, acceleration, deceleration, lane keeping, signaling, navigating, etc.). In another implementation, the notification 402 in accompanied by other changes to the environment inside the vehicle to assist the human operator in increasing awareness of the road conditions surrounding the vehicle (e.g., turning down music, interrupting video display, etc.).

The text notification 402 may be adjusted to be more intrusive or less intrusive to the human operator, depending on the nature of the road hazard or change in autonomous capabilities. If the vehicle is preparing to gain more control over navigation of the vehicle with a corresponding reduction in responsibility on the part of the human operator, then the notification 402 need not be highly intrusive because the notification 302 is more of an informational nature. On the other hand, if there is a problem with the vehicle's autonomous capabilities and the human operator is expected to take some or all responsibility for piloting the vehicle, then the notification 402 may be more intrusive to the human operator because the human operator must be made aware of the alert, which could involve interrupting another activity that the human operator may be engaged in (e.g., sleeping, reading, working, in conversation with another occupant of the vehicle, etc.). The text notification 402 may be made more or less intrusive to the human operator by changing text font, flashing text, increasing or decreasing brightness of the text notification 402, using colors to indicate urgency (e.g., red for high urgency, yellow or intermediate urgency, green for lower urgency, etc.).

In the implementation illustrated in FIG. 4, haptic feedback 404 may be used to notify a human operator of an impending road hazard or change in autonomous vehicle capabilities. Haptic feedback may emanate from haptic devices embedded in various parts of the interior of the vehicle such as in the vehicle seats, arm rests, headrests, vehicle and/or media control surfaces, etc. Haptic feedback signals 304 may accompany a text notification 404. Haptic feedback signals 404 may be used to make a notification more intrusive to a human operator. For example, if a human operator is deemed to be in a state of lowered attention span, such as when sleeping, reading a book, etc., then a haptic feedback signal 404 may assist in helping the human operator to "snap out" of her current state and to re-focus on the notification 402 and/or any road or vehicle conditions that require her attention.

Additionally, or alternatively, an audio alert 406 may be used to notify a human operator of an impending road hazard, an impending change in autonomous vehicle capabilities, or simply (as illustrated in FIG. 4) a notification to increase road awareness in the event that a change in autonomous driving capability is needed. An audio alert 406 may emanate from speakers located around the interior of the vehicle. Audio alert 406 may include sounds designed to attract the attention of a human operator and/or voice commands directed to the human operator. For example, a voice command in the audio alert 406 may instruct the human operator to prepare for an increase in driving responsibility or signal to the human operator how much time is left until the human operator will be expected to exercise more or less control over the vehicle. The audio alert 406 may be made more intrusive or less intrusive to a human operator by varying the volume of the audio alert 406, including a sound reflective of the urgency of impending changes to the human operator's responsibilities (e.g., an alarm sound for an urgent hazard, a soft voice or bell for a less urgent hazard, etc.).

In at least one implementation, the audio alert 406 includes a "keyword" that the human operator has been conditioned to respond to. For example, the human operator's name may be used as a signal to attract the human operator's attention. In another limitation, the keyword may be a warning word (e.g. "danger," "look out," "alert!") that the human operator may be conditioned to respond to. When the human operator hears the keyword, she is more likely to shift her attention away from other tasks and to focus on the road conditions surrounding the vehicle. A keyword may be more effective than a beep, bell, or other signal that the human operator is less likely to have been conditioned to respond to.

In at least one implementation, other visual alerts 408 are included to notify a human operator of an impending road hazard or impending change in autonomous vehicle capabilities. In one implementation, the visual alerts 408 include a light bulb (e.g., a light emitting diode) for flashing or steady illumination. In other implementations, the visual alerts 408 include an e-fabric display of images or colors on the interior of the vehicle (e.g., an alert symbol, a text message, a color indicating urgency, etc.). Like other alerting mechanisms in the vehicle, the visual alert 408 may be adjusted to be more intrusive or less intrusive to the human operation by varying the intensity of the alert (e.g., brightness of a light bulb), flashing the visual alert 408, changing the color of the visual alert 408, changing a message or symbol displayed by the visual alert 408, etc.

Figure 5:
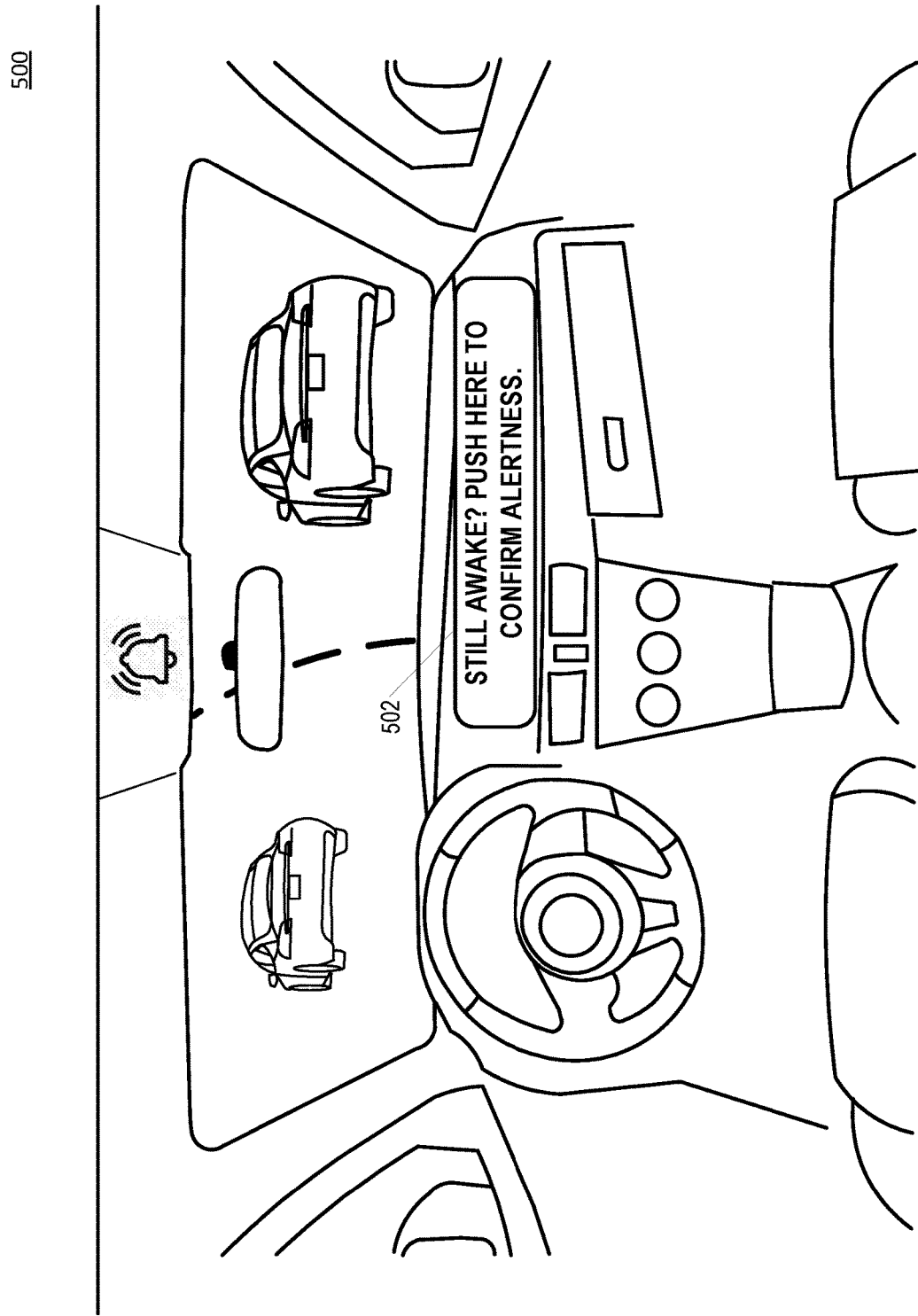
FIG. 5 is another in-vehicle view of an example system for determining risk of a human operator of a vehicle with autonomous capabilities.

FIG. 5 is another in-vehicle view of an example system 500 for determining risk of a human operator of a vehicle with autonomous capabilities. The system 500 includes a text notification 502 including request for acknowledgement from the human operator. The text notification 502 may serve as a "ping" to the human operator to test for responsiveness. When a human operator responds to the text notification 502 (e.g., through a touch interface, pushing a button, speaking a response into a microphone, etc.), the system 500 (e.g., a security arbiter on the vehicle) may record a responsiveness time associated with the human operator's acknowledgement of the text notification 502.

An intrusiveness level of the text notification 502 may be varied to test the human operator's reaction to different levels of intrusiveness. Some human operators may react well to minimally intrusive notifications and find more intrusive notifications to be irritating. Other human operators, on the other hand, may not respond well to minimally intrusive notifications and may need more intrusive notifications to respond to a request by the vehicle to assume more driving responsibility.

Figure 6:
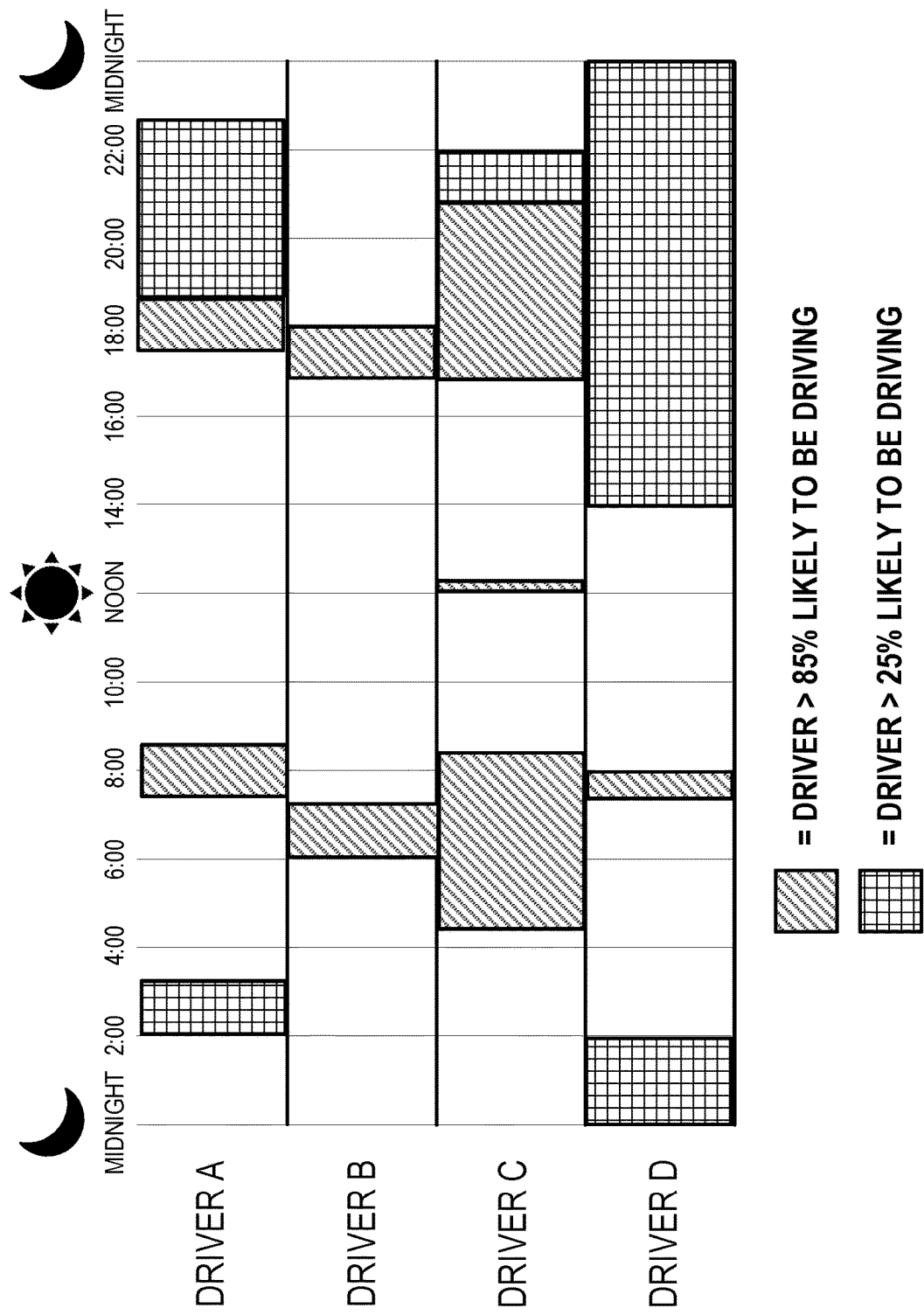
FIG. 6 is a time plot illustrating example usage patterns of four human operators of autonomous vehicles in a system for determining risk of the human operators in vehicles with autonomous capabilities.

FIG. 6 is a time plot 600 illustrating example usage patterns of four human operators of autonomous vehicles in a system for determining risk of the human operators in vehicles with autonomous capabilities. Human operator parameters may be broader than merely information about a human operator's current physical state directly detected by sensors inside the vehicle (e.g., camera, body sensors, etc.). Human operator parameters may also include information that has been collected in other ways such as biographical, demographic, or historical information. In this manner, human operator parameters may be used to create a driving capability profile of the human operator that may be used by components of the system to determine whether a change in autonomous vehicle capability is warranted and what type and duration of notification of such an impending change is appropriate for a particular human operator.

In one implementation, a driving capability profile includes human operator parameters based on usage patterns of a human operator. Time plot 600 is a comparison of four human operators, Drivers A-D, who each have typical vehicle usage schedules. Characteristics of a human operator's typical schedule may correlate with greater or lesser likelihood of a vehicle crash and may be used to determine risk of changing autonomous vehicle driving capability. In at least one implementation, an insurer calibrates the risk of insuring the human operators (Drivers A-D) based at least in part on the human operator's typical schedule. An insurer may expect a typical usage pattern and offer an insurance premium rate based on that schedule. A departure from the schedule may prompt the insurer to take several courses of action: the insurer may refuse to insure the vehicle is it is used outside of the human operator's typical usage pattern, the insurer may offer to insure the human operator at a higher rate for times outside the human operator's typical usage pattern, the insurer may insist on a change to the vehicle's autonomous capabilities depending on deviations from the human operator's typical usage pattern, etc.

In the time plot 600, Driver A has two periods of high vehicle usage likelihood, 07:45-08:15 in the morning and 17:50-18:20 in the evening. An insurer may infer that these periods of high use represent work commuting scenarios wherein the likelihood of a vehicle crash is rather low. Driver A also has periods of typical use after work from 18:20-22:30 and in the early morning from 02:00-04:00. An insurer may infer that these periods of time represent a higher likelihood of a vehicle crash due to a variety of factors (e.g., the human operator is more likely to be fatigued, intoxicated, other road users are more likely to be intoxicated, etc.). The insurer may therefore determine that different autonomous vehicle capability levels are more appropriate for the various use times. For example, an insurer may premise a premium price on the human operator agreeing to operate the vehicle only in a higher autonomous capability level in the higher risk time periods. Driver A's driving capability profile may therefore include Driver A's typical usage pattern and the insurer's determined likelihoods of vehicle crashes at the various points throughout the daily schedule.

Driver B, on the other hand, has typical usage patterns that include commuting but not travel outside of work hours. Driver B may live in a walkable neighborhood or use public transportation for non-commuting travel. For Driver B, an insurer may premise a premium cost on Driver B's driving capability profile which indicates that Driver B does not typically have experience driving at night. If Driver B one day decides to operate the vehicle at night, then the insurer may decide to refuse to insure the vehicle for that trip, offer an increased premium price, offer a premium price conditioned on Driver B's agreement to operate the vehicle according to certain autonomous vehicle capability levels, etc. Driver C has similar driving habits to Driver B, but more frequently operated the vehicle in the evening. An insurer may offer Driver C a premium price based on the occasional evening driving that differs from a premium offered to Driver B.

Driver D exhibits a typical usage pattern that includes a long block of uninterrupted vehicle usage from 14:00-2:00. Driver D's usage pattern may correlate with using the vehicle for work purposes, such as a ride sharing driver. An insurer may infer that Driver D is more likely to continue operating the vehicle despite fatigue due to the driver's need to earn money. Further, Driver D may be at higher risk due to road conditions during the night being less favorable than during the day.

A driving capability profile may depend on historical information other than a driver's typical usage schedule. For example, the location in which a driver typically uses a vehicle may be included in the driving capability profile. Some roads may be known to carry a higher risk of vehicle crash than others (e.g., a high speed highway may be more risky than a narrow neighborhood street). A human operator's typical areas of usage may therefore present a higher or lower risk to an insurer.

Another aspect of a human operator's driving capability profile may include historical information regarding the human operator's reaction time to notifications of a change in the vehicle's autonomous capabilities. Some human operators may be more included to recognize and respond to a notification (e.g., a notification that the human operator's driving responsibility will increase) than others. If a human operator typically responds quickly to a notification to increase awareness or to begin participating in the navigation of the vehicle, then that human operator may pose less of an insurance risk than a human operator who responds more slowly to a notification to increase awareness or to begin participating in the navigation of the vehicle. A human operator's prior responses to notifications to assume more driving control or otherwise participate in the navigation of the vehicle may be stored in the human operator's driving capability profile.

Figure 7:
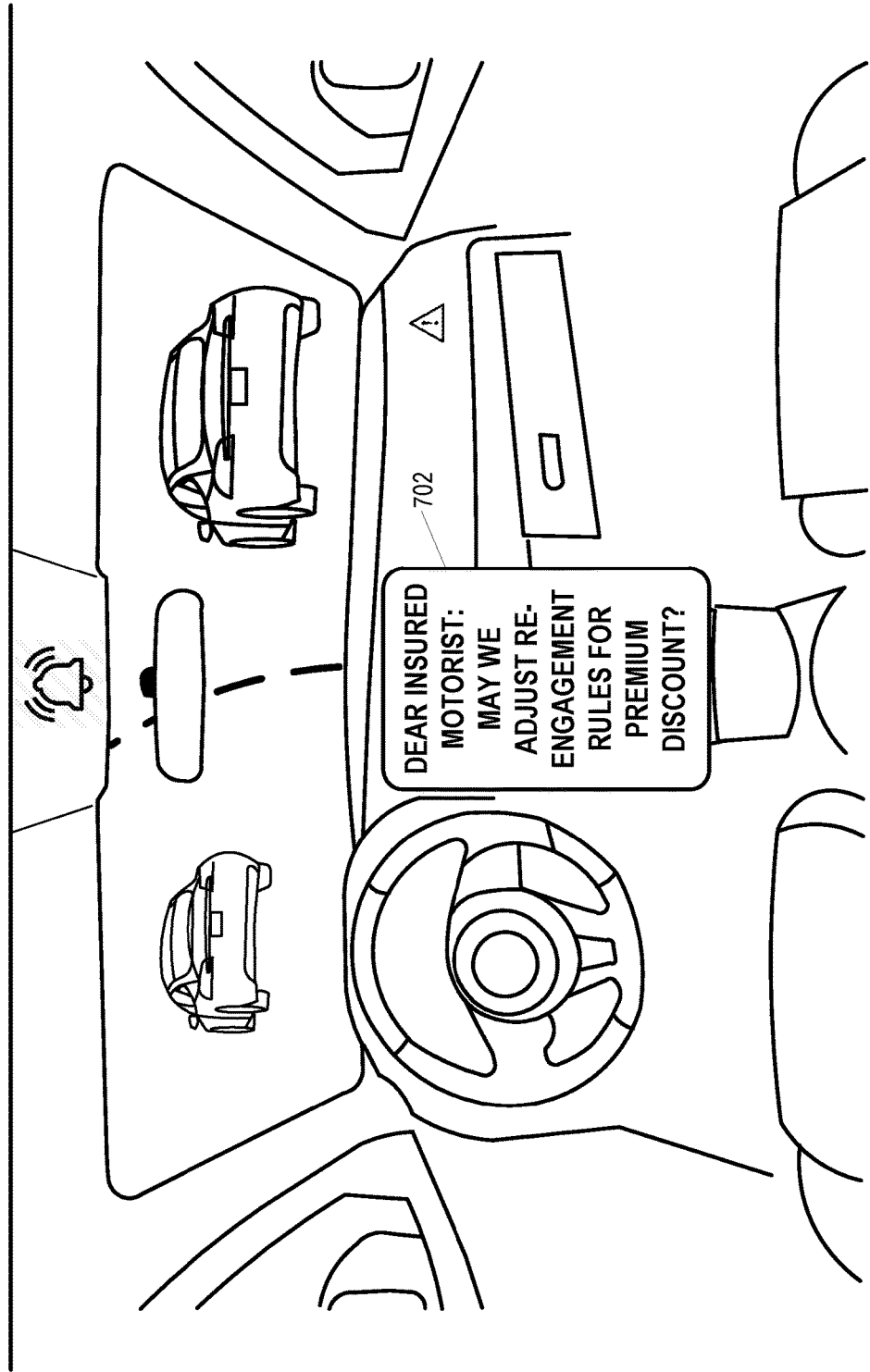
FIG. 7 is another in-vehicle view of an example system for determining risk of a human operator of a vehicle with autonomous capabilities.

FIG. 7 is another in-vehicle view of an example system 700 for determining risk of a human operator of a vehicle with autonomous capabilities. In at least one implementation, an insurer determines whether a human operator or a vehicle is more likely to safely navigate the vehicle in certain conditions. The insurer initiates a request to the human operator to be displayed as notification 702. The notification 702 may include an offer from an insurer to lower insurance premium prices in return for the human operator's agreement to allow the vehicle to assume a greater or lesser degree of autonomous control over road navigation depending on the rules preferred by the insurer. Rules preferred by the insurer may depend on factors such as the human operator parameters measured inside the vehicle, a driving history of the particular human operator in the vehicle, and data gathered regarding events outside the vehicle.

In one implementation, the notification 702 is an in-vehicle notification requesting adjustment based on factors such as the human operator's driving capability profile, human operator parameters, and potential road hazards. The in-vehicle notification 702 may therefore be an on-demand change to the vehicle's autonomous capabilities based on changing conditions. In another implementation, the notification 702 is not an in-vehicle notification, and may be based on an analysis of the human operator's driving capability profile and other information relating to the driver. In yet another implementation, the notification 702 indicates that current insurance coverage no longer covers the vehicle in case of a crash due to an increased risk as determined based on current human operator parameters, driving capability profile, and/or road conditions. If current insurance no longer covers the human operator, the notification 702 may display an offer for the human operator to make a one-time (or recurring) additional premium payment to continue insurance coverage. In at least one implementation, the vehicle may cease navigation if the human operator no longer has insurance coverage and declines to pay an additional premium to continue coverage. In another implementation, the additional premium payment may be variable based on a level of autonomous capability of the vehicle agreed to by the human operator.

Figure 8:
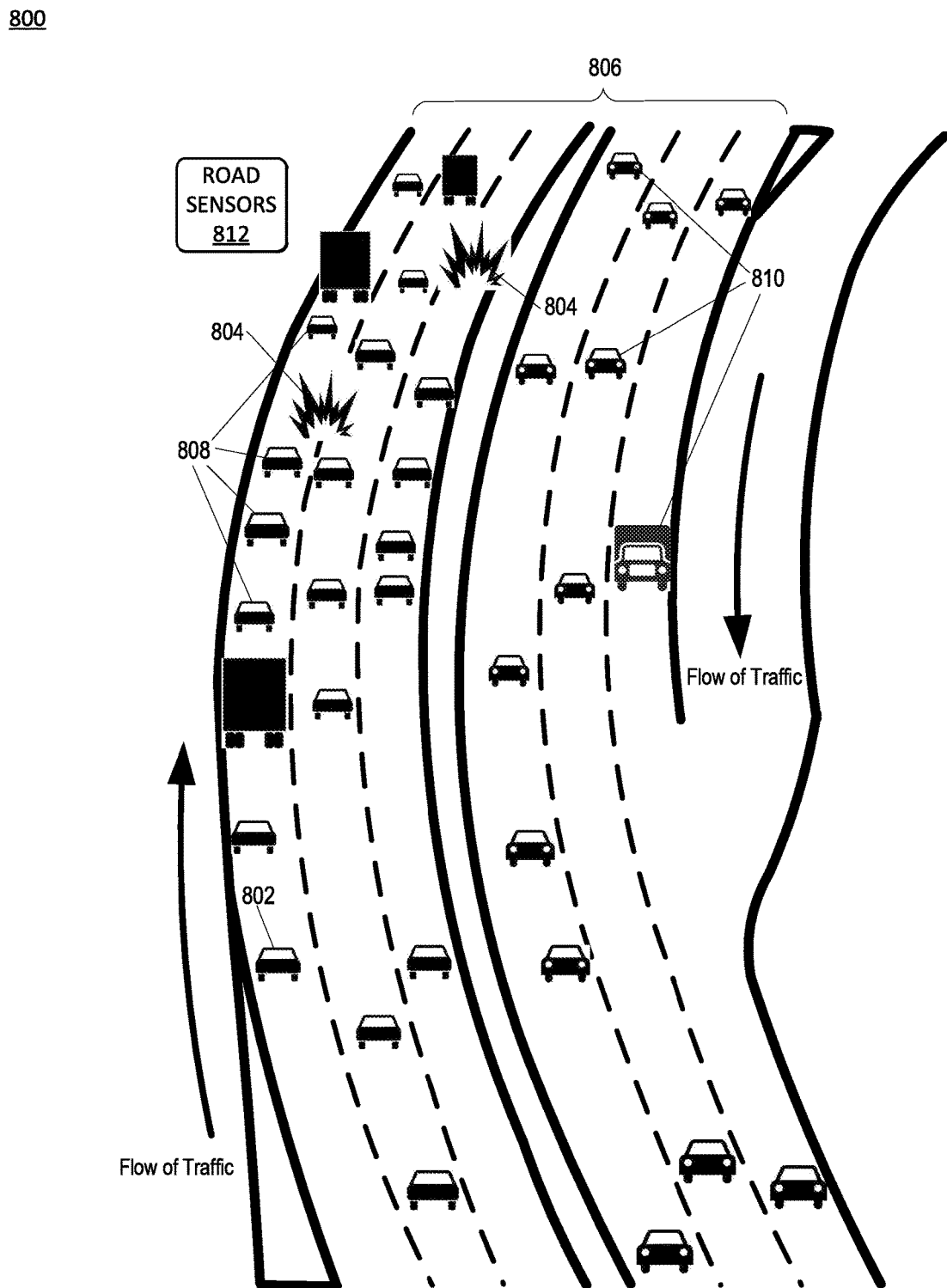
FIG. 8 is a schematic diagram of a vehicle equipped with an example system for manual control re-engagement in a vehicle approaching a road hazard.

FIG. 8 is a schematic diagram 800 of a vehicle 802 equipped with an example system for manual control re-engagement in an autonomous vehicle approaching a road hazard 804 on a road 806. Under some circumstances, it may be safer for the vehicle 802 to alter available autonomous capabilities to more safely navigate the road hazard 804. To make a determination whether it is safer to alter autonomous vehicle capabilities or to remain in the status quo, the vehicle detects a variety of human operator parameters regarding a human operator of the vehicle to determine a human operator alertness level. Also relevant to a determination of whether it is safer to alter autonomous vehicle capabilities of the vehicle 802 is an assessment of conditions on the road 806 and of the road hazards 804. In at least one implementation, the vehicle 802 receives information regarding conditions on the road 806 and of the road hazard 804 from other vehicles and from sensors in the road 806 itself.

The vehicle 802 includes components for managing a transition from one level of autonomous capabilities to another level of autonomous capabilities. One type of component to manage the transition is an evaluator in the vehicle 802 to evaluator to evaluate readiness of a human operator of a vehicle including one or more sensors. A security arbiter in the vehicle 802 determines a security risk to the vehicle (e.g., a road hazard, adverse conditions, diminished capacity of a human operator, etc.) and determines whether a level of autonomous capability of the vehicle should be adjusted by adding or removing autonomous capabilities and conversely adding or removing driving responsibility from a human operator. The security arbiter in the vehicle 802 may receive human input parameters directly from the human operator and/or from a remote party.

In at least one implementation, the security arbiter in the vehicle 802 evaluates a threat posed by the road hazard 804. The security arbiter may receive information regarding the threat from other road participants and remote parties. For example, vehicles 808 traveling in the same direction as the vehicle 802 but closer to the road hazard 804 may wirelessly relay information back to vehicle 802 and the other vehicles approaching the road hazard 804 on the road 806 behind the vehicles 808. The security arbiter may receive indications, for example without limitation that the vehicles 808 have encountered sharply lower road speeds or have observed adverse road conditions. The vehicles 808 may further relay information to the vehicle 802 regarding the location of the road hazards 804 on the road 806. The vehicles 808 may include telematics data in the information sent to the security arbiter in the vehicle 802 (e.g., heavy braking, high G-forces, etc.) As another example, third parties (e.g., government agencies, insurers, vehicle owners, etc.) may collect information regarding the conditions on the road 806 by way of remote sensors 812. The remote sensors 812 may detect road speeds and be able to determine whether vehicles are in distress or if a dangerous condition has developed on the road 806. Remote sensors 812 may be fixed in place roadside (e.g., vibration sensor, vehicle counter, camera, etc.) or may be mobile sensors (e.g., drone, unmanned aerial vehicle, helicopter, etc.).

After receiving data regarding the road hazard 804, the security arbiter may determine a security threat to the vehicle based on the road hazard 804 and other information available to the security arbiter. The security arbiter may further determine a change to autonomous vehicle capabilities that should be taken to improve safety when navigating the road hazard 804. Such a determination may be based on information available to the security arbiter or it may be an instruction received from a third party. The security arbiter may further determine a time period during which the change in the vehicle's autonomous capability should occur.

Another component in the vehicle 802 is a notification server. The notification server in the vehicle 802 may include hardware and software components (e.g., a display for text messages to a human operator inside the vehicle, speakers for playing audio text notifications and instructions, lights, feedback devices, an operating system, microphones, etc.) for presenting information to and receiving information from a human operator of the vehicle 802. The notification server presents notifications to a human operator of the vehicle 802. In at least one implementation, the security arbiter determines a time period and an intrusiveness level of After receiving data regarding the road hazard 804, the security arbiter may select a time period during which the vehicle should transition to a different level of autonomous capability. The time period may be calibrated based on the speed of the vehicle 802 on the road 806, the location of the road hazards 804, information received from vehicles 808, etc. In at least one implementation, the security arbiter may decrease speed of the vehicle to lengthen the time until the vehicle 802 reaches the road hazard 804. In at least one implementation, the security arbiter provides a time period to the notification server of the vehicle 802 during which changes to the vehicle's autonomous capabilities should be made. In implementations, a security arbiter requests the notification server to require human operator acknowledgement before implementing changes to the autonomous capabilities of the vehicle 802. In another implementation, the security arbiter will cease navigation of the vehicle if the human operator does not acknowledge increased driving responsibilities. In other implementations, the security arbiter implements a change in the autonomous capabilities of the vehicle 802.

Figure 9:
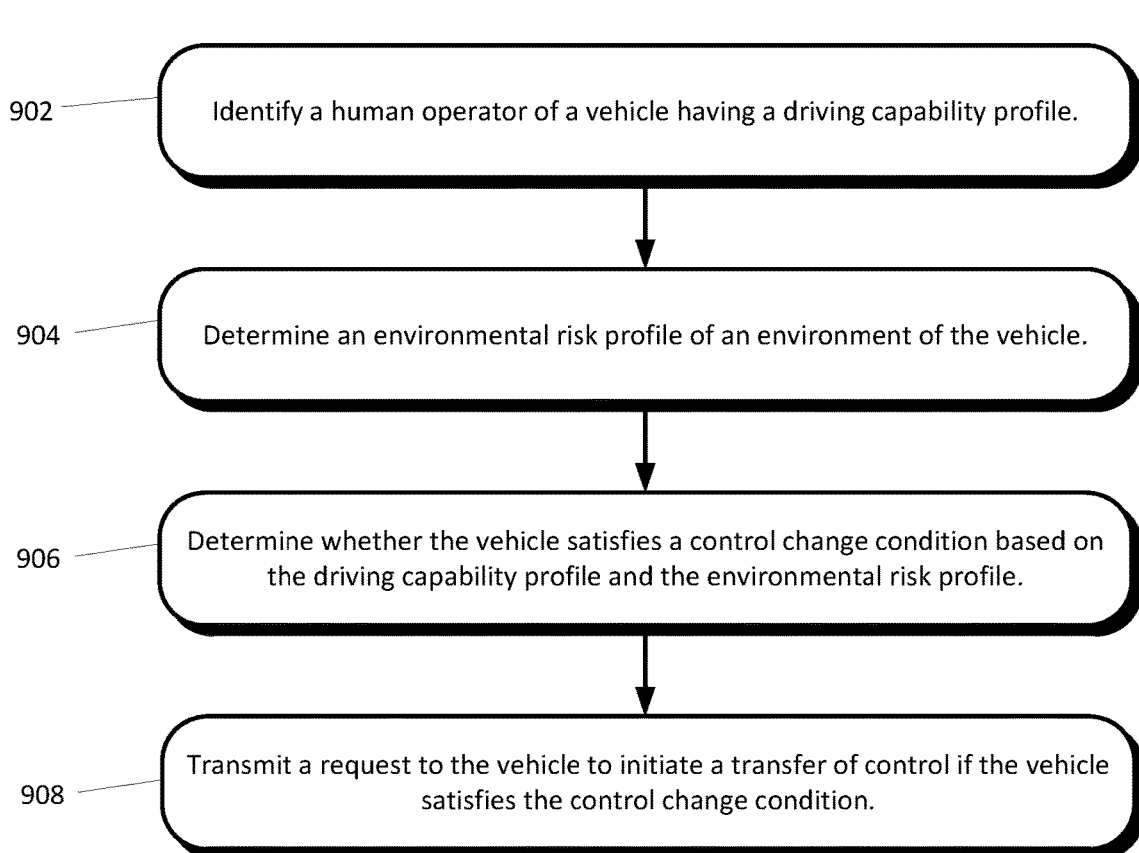
FIG. 9 illustrates example operations for determining the risk of a human operator of a vehicle with autonomous capabilities.

FIG. 9 illustrates example operations 900 for determining the risk of a human operator of a vehicle with autonomous capabilities. An identifying operation identifies a human operator of a vehicle wherein the human operator has a driving capability profile. The human operator's driving capability profile may be based on multiple factors including without limitation the results of a skill test of the human operator, a history of the human operator's prior responses to notifications of a change of a change to the vehicle's autonomous capabilities (especially response time and quality to notifications that the human operator should assume a greater degree of driving responsibility), typical usage patterns and locations of the human operator, an insurance coverage amount of the vehicle, etc. In one implementation, the identifying operation 902 includes identifying the human operator via sensors inside the vehicle (e.g., a camera with facial recognition of the human operator).

A determining operation 904 determines an environmental risk profile of an environment of the vehicle. The environmental risk profile may be based on a number of available factors including information received from other vehicles operating on the same road (e.g., vehicle crash information, road hazard information, emergency control reports, traffic density information regarding the road, etc.), information received from an entity monitoring the road (e.g., a government agency, insurer, etc.), and/or information detected by the vehicle itself (e.g., outside weather and temperature conditions, traffic density, etc.). In one implementation, the environmental risk profile includes whether and how many other vehicles on the same road are able to communicate with one another, especially whether the other vehicles on the road are able to communicate emergency signals to other vehicles and to respond to emergency signals received from other vehicles. If a significant portion of the vehicles travelling on a road together are able to share emergency information with one another, then there is a reduced likelihood of a vehicle crash and subsequent liability for an insurer. Also liability could be reduced where all vehicles respond similarly to a road hazard (e.g., when applying a legal standard of reasonable precautions).

A determining operation 906 determines whether the vehicle satisfies a control change condition based on the driving capability profile and the environmental risk profile. A security arbiter on the vehicle may perform determining operation 906 or the determining operation 906 may be performed by a disparate entity and communicated to the vehicle. A driving capability profile and environmental risk profile may interact in a complex way in that each may weight a variety of factors. For example, for a given environmental risk profile of an environment surrounding the vehicle (e.g., two vehicles adjacent to one another on the same road traveling in the same direction at the same speed), the determining operation 906 may determine that a control change condition is satisfied for one vehicle but not the other due to differences between the driving capability profiles of the respective human operators. A driving capability profile may further include a driving skill of each human operator in dealing with various types of road hazards. For example, some human operators may be more adept at driving in the rain than other human operators, but less adept at driving at night.

The control change condition is satisfied if the determining step 906 determines that it is more likely that the vehicle will safely navigate the environmental risks in the environment of the vehicle if the autonomous capabilities of the vehicle are changed rather than left in the status quo. The control change condition may be satisfied if the determining step 906 determines that additional autonomous competencies should be added to the autonomous abilities exercised by the vehicle or if the determining step 906 determines that the human operator should exercise more control over navigation of the vehicle. If the determining step 906 determines that the vehicle satisfies the control change condition, a transmitting step 908 transmits a request to the vehicle to initiate a transfer of control.

Figure 10:
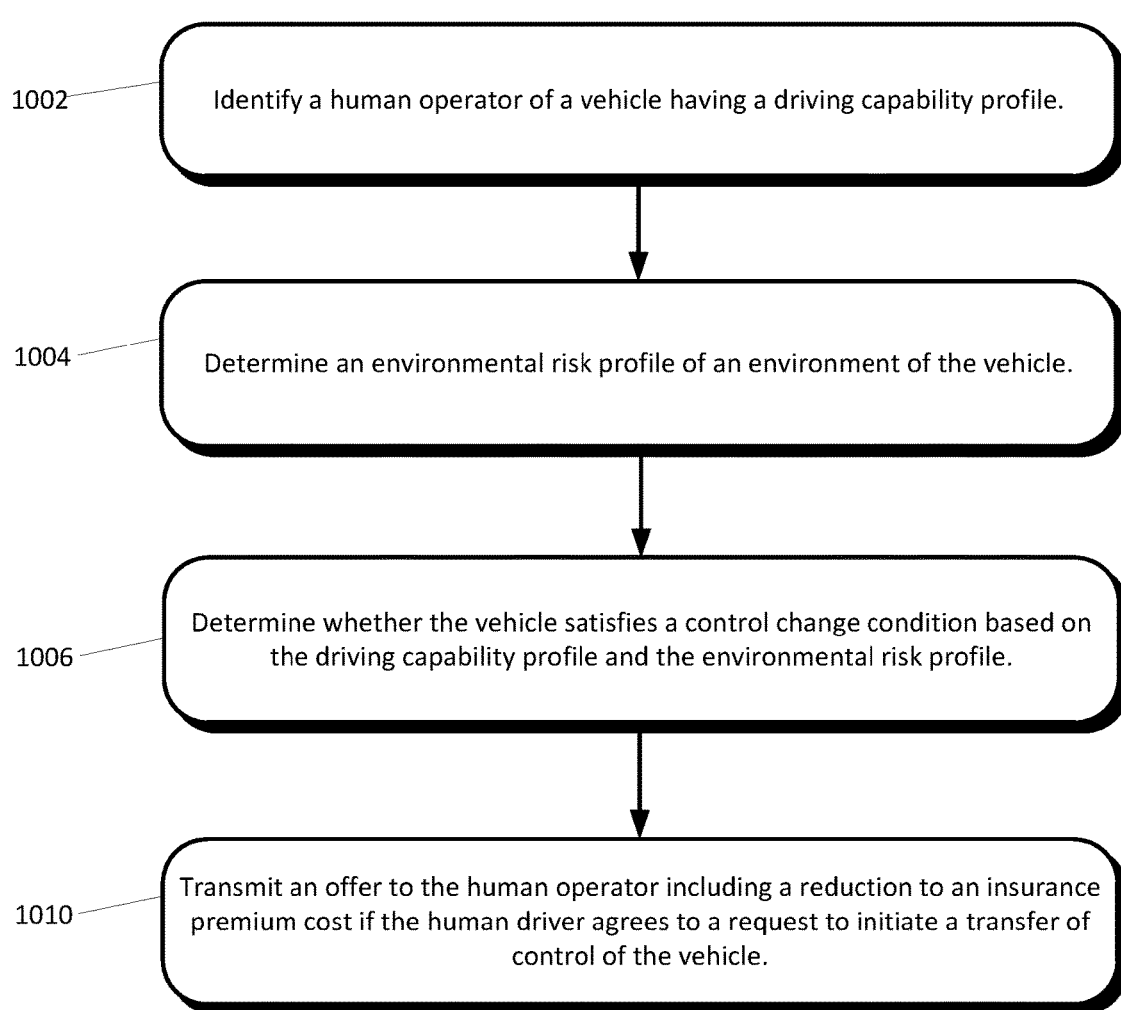
FIG. 10 illustrates more example operations for determining the risk of a human operator of a vehicle with autonomous capabilities.

FIG. 10 illustrates more example operations 1000 for determining the risk of a human operator of a vehicle with autonomous capabilities. The operations 1000 include an identifying step 1002 that identifies a human operator of the vehicle, a determining step 1004 that determines an environmental risk profile of the vehicle, and a determining operation that determines whether the vehicle satisfies a control change condition based on the driving capability profile and the environmental risk profile. Operations 1002, 1004, and 1006 may be performed as described above with reference to FIG. 9.

A transmitting operation 1010 transmits an offer to the human operator of the vehicle wherein the offer includes a reduction to an insurance premium cost if the human driver agrees to a request to initiate a transfer of control of the vehicle. The offer may include lower insurance premium prices in return for the human operator's agreement to allow the vehicle to assume a greater or lesser degree of autonomous control over road navigation depending on the rules preferred by the insurer. Rules preferred by the insurer may depend on factors such as the human operator parameters measured inside the vehicle, a driving history of the particular human operator in the vehicle, and data gathered regarding events outside the vehicle.

In one implementation, the offer is an in-vehicle notification requesting adjustment based on factors such as the human operator's driving capability profile, human operator parameters, and potential road hazards. The offer may therefore be an on-demand change to the vehicle's autonomous capabilities based on changing conditions. In another implementation, the offer is not an in-vehicle notification, and may be based on an analysis of the human operator's driving capability profile and other information relating to the driver. In yet another implementation, the offer indicates that current insurance coverage no longer covers the vehicle in case of a crash due to an increased risk as determined based on current human operator parameters, driving capability profile, and/or road conditions. If current insurance no longer covers the human operator, the offer may include the human operator making a one-time (or recurring) additional premium payment to continue insurance coverage. In at least one implementation, the vehicle may cease navigation if the human operator no longer has insurance coverage and declines to pay an additional premium to continue coverage. In another implementation, the additional premium payment may be variable based on a level of autonomous capability of the vehicle agreed to by the human operator.

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A method of initiating transfer of control of a vehicle, the method comprising:
    identifying a human operator of the vehicle, the human operator being associated with a driving capability profile;
    determining an alertness level of the human operator based on: (i) an activity level determined from video data of the human operator, and (ii) at least one of vehicle accident history, vehicle usage history, or biographical data;
    determining an environmental risk profile of an environment of the vehicle;
    determining that the vehicle satisfies a control change condition based on the driving capability profile, the alertness level, and the environmental risk profile; and
    in response to the determination that the vehicle satisfies the control change condition, initiating transfer of control to engage manual control.

2. The method of claim 1, wherein the driving capability profile is based at least in part on a past performance of the human operator in engaging manual control of a vehicle.

3. The method of claim 1, wherein the driving capability profile is based at least in part on past performance of the human operator in adverse driving conditions.

4. The method of claim 1, wherein the environmental risk profile is based at least in part on one or more of an expected route of the vehicle or sensed road conditions.

5. The method of claim 1, wherein the environmental risk profile includes an indication that the human operator is operating the vehicle in an unsafe manner.

6. A system for initiating transfer of control of a vehicle, the system comprising:
    an evaluator configured to evaluate a human operator of a vehicle, the evaluator including one or more sensors configured to detect human operator parameters, wherein the evaluator is further configured to determine an alertness level of the human operator based on: (i) the human operator parameters, (ii) an activity level determined from video data of the human operator, and (iii) at least one of vehicle accident history, vehicle usage history, or biographical data;
    an environmental threat assessor configured to assess one or more road hazards; and
    a control circuit configured to initiate a change in control to engage manual control of the vehicle based on the alertness level and the one or more road hazards.

7. The system of claim 6, wherein the human operator parameters include a vehicle usage schedule of the human operator.

8. The system of claim 6, wherein the control circuit is further configured to navigate the vehicle to a safe location if the change in control of the vehicle is unsuccessful.

9. The system of claim 6, wherein the control circuit effects the change in control of the vehicle by displaying a first notification to the human operator, the first notification being based on the human operator parameters and the one or more road hazards.

10. The system of claim 9, wherein the control circuit effects the change in control of the vehicle by displaying a second notification, the second notification being different than the first notification and being based on the human operator parameters and the one or more road hazards.

11. The system of claim 9, wherein the first notification is further based at least on a distance between the vehicle and at least one of the one or more road hazards.

12. The system of claim 6, wherein the one or more sensors include one or more of a body temperature sensor or a facial recognition sensor.

13. A system comprising:
one or more processors; and
one or more memories coupled to the one or more processors;
the one or more memories including computer executable instructions stored therein that, when executed by the one or more processors, cause the one or more processors to perform:
identifying a human operator of a vehicle, the human operator being associated with a driving capability profile;
determining an alertness level of the human operator based on: (i) an activity level determined from video data of the human operator, and (ii) at least one of vehicle accident history, vehicle usage history, or biographical data;
determining an environmental risk profile of an environment of the vehicle;
determining whether the vehicle satisfies a control change condition based on the driving capability profile, the alertness level, and the environmental risk profile;
transmitting an offer to the human operator if the vehicle satisfies the control change condition, the offer including a reduction to an insurance premium cost if the human operator agrees to a request to initiate a transfer of control to engage manual control of the vehicle; and
if the human operator agrees to the request, initiating transfer of control to engage manual control.

14. The system of claim 13, wherein a magnitude of the reduction to the insurance premium cost if the human operator agrees to a request to initiate a transfer of control of the vehicle is based at least in part on the driving capability profile and the environmental risk profile.

15. The system of claim 13, wherein the driving capability profile is based at least in part on an intoxication level of the human operator.

16. The system of claim 13, wherein the environmental risk profile of the environment of the vehicle is based at least in part on a usage history of the human operator.

17. The method of claim 1, wherein the driving capability profile includes a vehicle usage schedule of the human operator including at least one time period of high likelihood of vehicle usage.

18. The system of claim 6, wherein:
the evaluator is further configured to use the human operator parameters to determine a driving capability profile of the human operator, and the driving capability profile includes a vehicle usage schedule of the human operator including at least one time period of high likelihood of vehicle usage; and
the control circuit is further configured to initiate the change in control further based on the driving capability profile.

19. The system of claim 13, wherein the driving capability profile includes a vehicle usage schedule of the human operator including at least one time period of high likelihood of vehicle usage.

20. The method of claim 1, wherein the alertness level is level is based on all of the vehicle accident history, vehicle usage history, and biographical data.

21. The method of claim 1, wherein the alertness level is further based on if the human operator is reclined in a seat of the vehicle.

22. The method of claim 1, wherein the alertness level is level is based on the vehicle accident history, or the vehicle usage history.

23. The method of claim 1, wherein the biographical data includes age or education level of the human operator.

* * * * *